United States Patent [19]

Yoneyama et al.

[11] Patent Number: 4,601,003
[45] Date of Patent: Jul. 15, 1986

[54] DOCUMENT REARRANGEMENT SYSTEM

[75] Inventors: Tsuneo Yoneyama, Yokosuka; Koji Izawa, Yokohama, both of Japan

[73] Assignee: Tokyo Shibaura Denki Kabushiki Kaisha, Kawasaki, Japan

[21] Appl. No.: 554,247

[22] Filed: Nov. 22, 1983

[30] Foreign Application Priority Data

Nov. 24, 1982 [JP] Japan ................. 57-204524

[51] Int. Cl.⁴ .................. G06F 15/40; G06F 3/153
[52] U.S. Cl. ...................... 364/518; 340/717; 340/790; 364/188; 364/900
[58] Field of Search ........... 364/188, 200, 518, 900; 360/71, 72, 73, 74.4; 340/706, 707, 716, 718, 724, 723, 734, 790

[56] References Cited

U.S. PATENT DOCUMENTS

| | | | |
|---|---|---|---|
| 3,346,853 | 10/1967 | Koster et al. | 364/900 |
| 3,800,288 | 3/1974 | Russell et al. | 364/200 |
| 3,872,446 | 3/1975 | Chambers | 340/717 |
| 3,930,237 | 12/1975 | Villers | 364/518 |
| 4,001,807 | 1/1977 | Dallimonti | 364/518 |
| 4,085,446 | 4/1978 | Nagamura | 364/900 |
| 4,396,977 | 8/1983 | Slater et al. | 340/706 |
| 4,408,181 | 10/1983 | Nakayama | 364/900 |
| 4,437,127 | 3/1984 | Hirose | 364/900 |
| 4,521,870 | 6/1985 | Babbel et al. | 364/900 |

FOREIGN PATENT DOCUMENTS 1487507  10/1977  United Kingdom ............ 364/900

Primary Examiner—Felix D. Gruber
Attorney, Agent, or Firm—Oblon, Fisher, Spivak, McClelland & Maier

[57] ABSTRACT

A document rearranging system is disclosed which includes an optical disk device storing a totality of electrical image information representing paper documents, a first CRT for displaying new document image information to be filed, and a second CRT for selectively displaying a first image presenting a perspective pictorial illustration of an actual work place in which various types of document filing office equipment including a desk with drawers and a filing cabinet are arranged and a second image representing desired one set of filing holders among a plurality of sets of filing holders in the office equipments. A CPU section is provided to: cause the second CRT to display the first image; change a display screen so as to display the second image which enlarges and illustrates the set of filing holders contained in one office equipment selected by the operator who refers to a conceptual work place image displayed on the second CRT; produce code data specifying a holder image component selected by the operator; and correlate the document information with the electrical code data to store the document information in the optical disk device.

18 Claims, 10 Drawing Figures

| FIRST SUBCODE | IMAGE PATTERN |
|---|---|
| 001 | MENU |
| 002 | LABEL |
| 003 | EDIT |
| 004 | FILE |
| 005 | (CABINET) |
| 006 | (DESK) |
| 007 | (DOC.TRAY) |
| 008 | (BASKET) |
| ⋮ | ⋮ |
| 100 | (DOCUMENT) |
| 101 | (DOCUMENT) |
| ⋮ | ⋮ |

F I G. 10
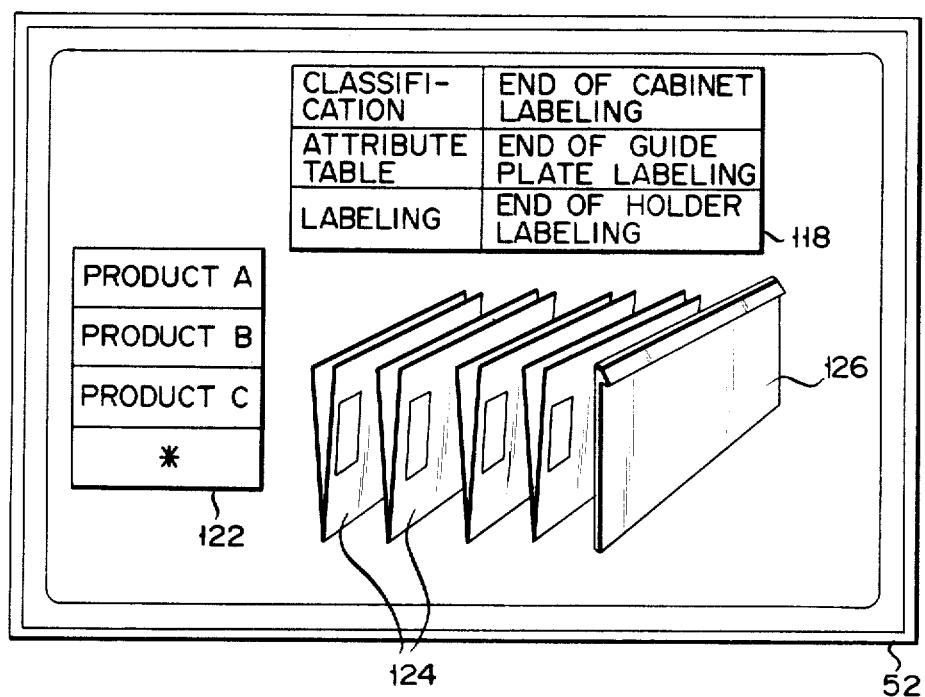

DOCUMENT REARRANGEMENT SYSTEM

BACKGROUND OF THE INVENTION

The present invention relates in general to a document filing system and, more particularly, to a system for indexing/filing document information and editing it to satisfy the various needs of a user.

A computerized system for electrically indexing and filing document information and automatically retrieving desired document information is becoming increasingly significant in effectively storing in a small space large numbers of documents handled on a daily basis. According to a conventional document filing system of this type, in order to obtain a desired document from filed documents (e.g., publications, patent documents or the like) indexed and stored in a large-capacity memory (e.g., optical disk) in a predetermined data file structure, character index data corresponding to the desired document is entered at the keyboard, so that the system can automatically search and retrieve the desired document. The conventional document filing system of the type has an advantage in that it comprises a large scale fixed information system created in such a manner as to allow many users to utilize information, which is freely available to the public. However, the information stored in such a system cannot be sequentially edited to satisfy individual needs, thus failing to provide system flexibility.

Consider the daily document filing performed in relation to individual workers in offices or the like so far as daily clerical work is concerned. In this case, each office worker has a desk with drawers, a filing cabinet and the like. In general, the worker files documents created in the progress of his or her work in a filing space consisting of the desk and filing cabinet and the like in accordance with his judgment. Various types of documents are handled in the performance of tasks assigned to the individual workers, and are subjected to changes in values and filing methods in the progress of the assigned tasks and upon reorganization of a company. For this reason, the information filing concept under the above situation must be one which can handle such changes. However, the conventional document filing system cannot be properly used in the above-mentioned case.

SUMMARY OF THE INVENTION

It is an object of the present invention to provide a new and improved document rearrangement system wherein a rearranging/indexing system as a basis for storing document information is not fixed, and the rearranging/indexing system can be freely rearranged (changed) in a suitable form required by an individual user or operator, thereby aiding document filing, storage and retrieval by an individual office worker.

According to the present invention, a computerprocessed document rearrangement system stores electrical document image information representing paper documents in accordance with a rearranging/indexing system which allows subsequent editing so as to perform filing of the document information. The document rearrangement system comprises a memory device for storing a totality of document information, first display unit for displaying a piece of document image information to be newly filed, and second display unit for selectively displaying first and second picture image patterns. The first picture image pattern represents a pictorial illustration of an actual work place in which are placed various types of office equipment commonly used to store the paper documents. The first picture image pattern provides an operator a model image of a local work location of the actual work place. The second picture image pattern represents one set of filing holders among a plurality of sets of filing holders in the office equipment. A control device is provided to: cause the second display unit to display the first picture image pattern; change a display screen so as to display the second picture image pattern which enlarges and illustrates a set of filing holders contained in one type of office equipment among the various types of office equipment when the operator selects the one type of office equipment upon referring to a conceptual work place image pattern displayed at the second display device; produce electrical code data specifying a holder image pattern component when the operator selects the holder image pattern component; correlate the document information with the electrical code data; and store the document information in the memory device.

BRIEF DESCRIPTION OF THE DRAWINGS

The present invention is best understood by reference to the accompanying drawings, in which:

FIGS. 4 through 10 are diagrams illustrating displayed contents on the screen of the CRT display device 52 when the system performs certain main operations shown in FIG. 1.

DETAILED DESCRIPTION OF THE PREFERRED EMBODIMENT

Figure 1:
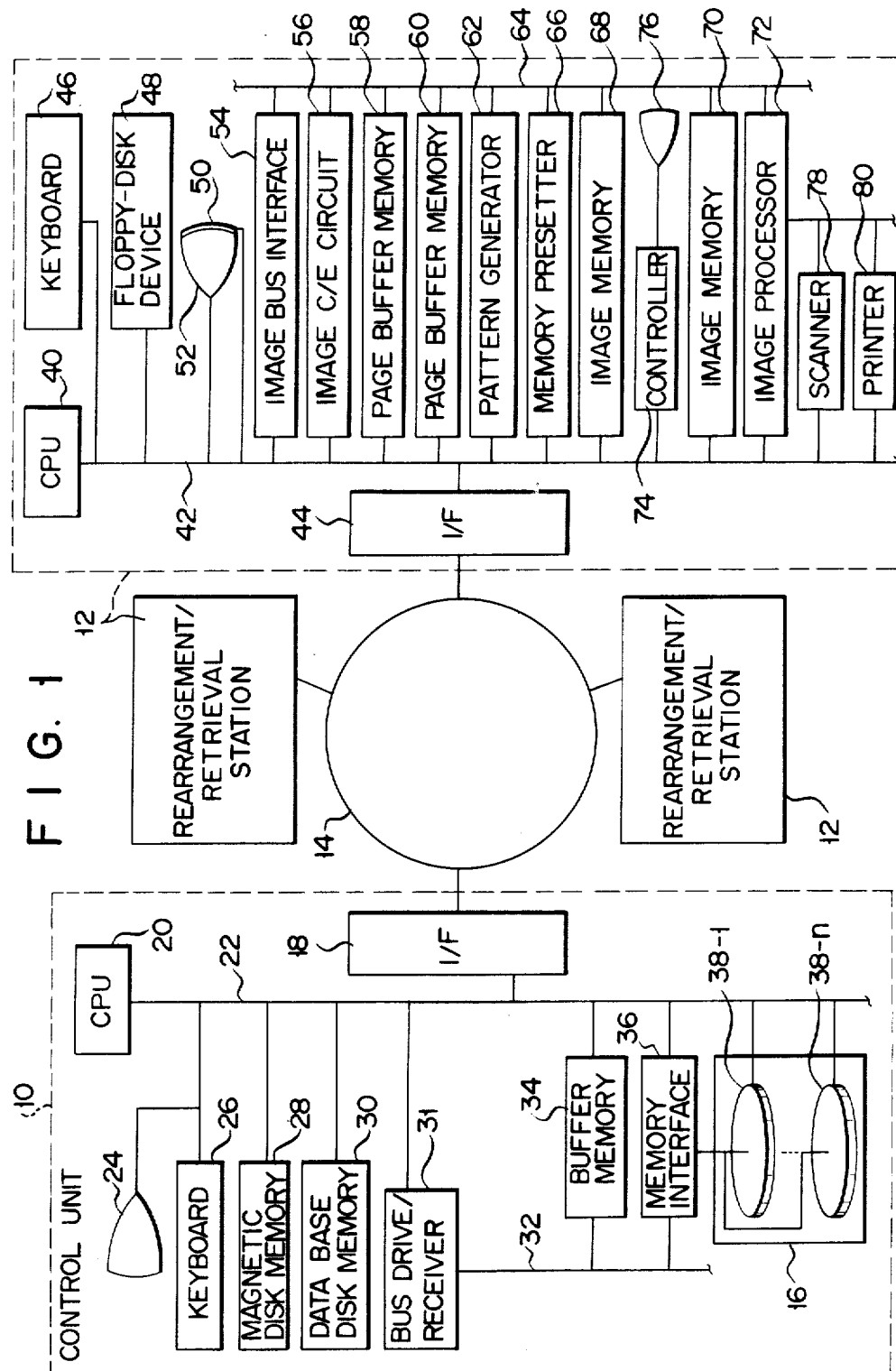
FIG. 1 is a block diagram showing a computerized document filing system in accordance with one embodiment of the present invention.

As shown in FIG. 1, a document information rearrangement system according to one embodiment of the present invention has an information control unit 10 and a plurality of work stations or rearrangement/retrieval stations 12 at which individual office workers operate. The control unit 10 and the stations 12 are interconnected to communicate with each other through a looplike network 14 including a command data bus. Each station 12 may be occupied by a single operator. Each station 12 is arranged to perform necessary document processing such as registration, editing, rearrangement and retrieval of documents created in the progress of work, and is operated independently of the other stations. The control unit 10 controls the entire system and includes a large-capacity memory device such as an optical disk device or memory 16. The optical disk device 16 has a sufficient memory capacity to commonly store document information entered at all the stations 12. In this manner, a given station 12 is entirely independent of the other stations and can freely read/write document information in the optical disk device 16 of the control unit 10 remotely located from the given station 12. Each station 12 is arranged to freely rearrange document information read from the optical disk device 16 in accordance with the will of the corresponding operator. The system configuration will be described in detail hereinafter.

The control unit 10 has a network interface 18 for interfacing data communication with the stations 12, and a central processing unit (CPU) 20. In this embodiment, a CPU Z8000 (trade name) manufactured by Zilog (U.S.A.) is used as the CPU 20. A system data bus 22 of the CPU 20 which is connected to the network 14 through the interface 18 is connected to a CRT display device 24 serving as a system console, a keyboard 26, a magnetic disk memory device 28 for prestoring a system program, and a fixed magnetic disk device 30 for prestoring a data base for retrieving document information. The data bus 22 is further connected to a bus drive/receiver 31 for receiving and transmitting the document information. An image bus 32 also serving as a data bus is connected to the bus drive/receiver 31. The optical disk device 16 is provided together with a buffer memory 34 and an optical disk memory interface 36 between the system buses 22 and 32. The optical disk device 16 has n optical disks 38-1, ..., and 38-n. The picture information or document information which is read out from the optical disks 38-1, ..., and 38-n is transferred to the image bus 32 through the memory interface 36. The buffer memory 34 serves to temporarily store image information to match the transmission rate of the image information supplied from each station 12 to the control unit 10 and the write rate of the image information to be actually written in the optical disk device 16.

Document information supplied from each station 12 for the first time is assigned a predetermined label code and is stored together with corresponding memory address data in the predetermined optical disk 38-1, ..., or 38-n. The data base for data retrieval which is prestored in the fixed magnetic disk device 30 includes a data table showing the correspondence between the address of the optical disk memory and the corresponding information name (i.e., label code). Therefore, when the specific image information is accessed based on the corresponding label code, the CPU 20 reads an address of the optical disk memory 16 in accordance with the data base in the fixed magnetic disk device 30 and accesses the optical disk memory 16 in accordance with this address, thereby searching the specific image information.

The information rearrangement/retrieval stations 12 will be described. The internal configuration of all these stations 12 is the same, so only one station is exemplified in FIG. 1 for illustrative convenience. The station 12 has a CPU 40 comprising a CPU 8085 (trade name) manufactured by Intel Corp (U.S.A.). A system bus 42 for the station CPU 40 is connected to the network 14 through a network interface 44, and also to a keyboard 46, a magnetic disk (floppy disk) device 48 and a touch screen 50 of a conversational graphic CRT display device 52 used for command entry. The keyboard 46 is used as an auxiliary input device used for creating an operating system (program software) when the operator uses the system for the first time. The floppy disk device 48 stores hierarchical data (a subcode array corresponding to the image pattern identification codes; to be described in detail later) required to properly display predetermined image pattern components at given coordinates in a display area of the CRT display device 52 in accordance with the operation of the station 12. As is well-known to those skilled in the art, the touch screen 50 produces a signal representing coordinates of a contact point when an object (e.g., touch pen or write pen) is brought into contact with the point. The system bus 42 is also connected to an image bus interface 54, an image data compression/expansion circuit (image C/E circuit) 56, first and second page buffer memories 58 and 60, and a character/pattern generator 62, which are all also connected to each other through an image bus 64. The image bus interface 54 serves as a kind of matching repeater with respect to the image information. The image C/E circuit 56 has a compression function whereby an uncessary portion of the registered document information is eliminated, and the document information can be converted to efficient image information equivalent to the original information in the same manner as in a known facsimile system. The image C/E circuit 56 also has an expansion function opposite to the compression function. The first and second page memories 58 and 60 serve to store a predetermined amount of information among the image information read out from the optical disk device 16 in the control unit 10. The information stored in the memories 58 and 60 will not be processed, so that the original image information from the optical disk device 16 is stored in the first and second page memories 58 and 60 without modification. The two page memories 58 and 60 are arranged to increase the display speed. The character/pattern generator 62 comprises a read-only memory (ROM) for storing a data table between the code signal and the corresponding actual image information.

A memory preset circuit or memory presetter 66, first and second display image memories 68 and 70, and an image processor 72 are arranged between the system bus 42 and the image bus 64. The first and second image memories 68 and 70 are connected to a CRT display device 76 for document display through a display controller 74. Pieces of document image information from the image memories 68 and 70 are supplied to the display controller 74. Under the control of the controller 74, these pieces of document image information can be displayed on the CRT display device 76. The memory presetter 66 stores coordinate data when the image information is displayed on the document CRT display device 76. This data is supplied from the station CPU 40 when the image information is displayed on the CRT display device 76. The CPU 40 performs the required control of the document information. The first and second image memories 68 and 70 store all information required when the operator wishes to partially change and/or move information (i.e., image editing). The image information read out from the first memory 68 is displayed on the CRT display device 76, while the next image information to be displayed is stored in the second image memory 70. The two memories 68 and 70 are arranged as an image memory section which serves to eliminate dead time prior to display.

The system bus 42 is connected to scanner 78 and a printer 80 which are also connected to the image processor 72. The scanner 78 scans the paper documents when they are registered for the first time and produces a corresponding electrical image data. The printer 80 is arranged to produce hard copies of documents, as needed. The data transmission associated with the scanner 78 and the printer 80 is not directly effected from the system bus 42 but is effected through the image processor 72. The image processor 72 enlarges/reduces the document image in accordance with geographic mode conversion techniques. The original paper documents optically read by the scanner 78 have different paper sizes. In order to store information from such paper documents, a predetermined paper size (e.g., A4 size) is used as a reference so as to enlarge/reduce the paper size, thereby effectively filing the document information.

The document information rearrangement system having the configuration described above can perform 5 unique document rearrangement/filing as follows.

Figures 2, 3:
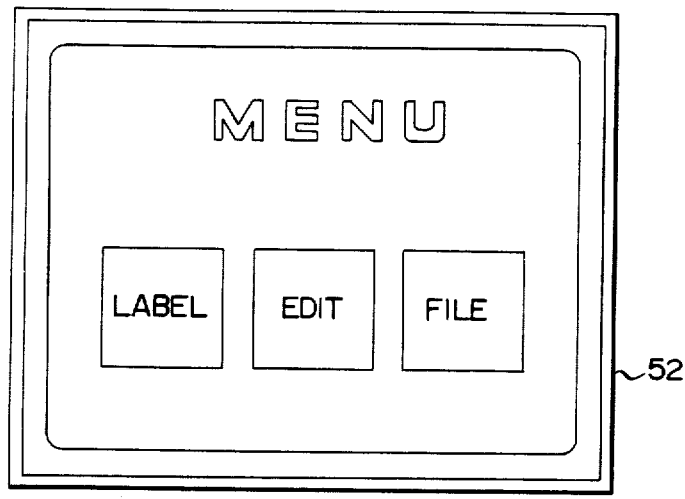
FIG. 2 shows a screen of a CRT display device 52 arranged in a station unit of FIG. 1 and illustrating a MENU mode.
FIG. 3 is a table showing the relationship between the image pattern components and the code data.

When the office worker or operator assigned to one information rearrangement/retrieval station 12 depresses the power switch, the station CPU 40 causes the components of the station 12 to become operative. At the same time, the CPU 40 signals a menu selection mode to the main CPU 20 of the control unit 10. In this case, the menu selection image pattern shown in FIG. 2 is displayed on the CRT display device 52 with the touch screen 50 of the station 12. The operation of the components associated with the above operation will be described in detail hereinafter.

Upon the start of the station 12, the CPU 40 supplies to the floppy disk device 48 through the bus 42 a menu mode execution code among pattern identification codes each consisting of three numerals. Each of the pattern identification codes consists of a combination $(A_i, B_i)$ where the first subcode $A_i$ indicates the individual image pattern component and the second subcode $B_i$ indicates coordinates of the image pattern component on the display area. A plurality of such data arrays or combinations are prestored in the floppy disk device 48.

TABLE

| Pattern identification code | Elements ($A_i$, $B_i$) |
|---|---|
| . | |
| . | |
| . | |
| 531 | $(001,n_1), (002,n_2), (003,n_3) (004,n_4)$ |
| 532 | $(005,n_5), (006,n_6), (007,n_7) (008,n_8)$ |
| . | |
| . | |
| . | |

The correspondence between the first subcodes $A_i$ and the actual image patterns displayed on the CRT 52 is illustrated in FIG. 3. When the station 12 is set in the menu selection mode and the code "531" is supplied from the CPU 40 to the floppy disk device 48, subcodes $(A_i, B_i)$ corresponding to the code "531" are $(001,n_1)$, . . . and $(004,n_4)$. The first subcodes $A_i$ (=001, 002, . . . and 004) of subcodes $(A_i, B_i)$ are suplied to the control unit 10 through the interface 44, while the $B_i$ (=$n_1$, . . ., and $n_4$) are sequentially transferred to and stored in the memory presetter 66.

The first subcodes $A_i$ supplied to the control unit 10 are fetched through the interface 18 in a processing system having the main CPU 20 as a core, and are subjected to reference with the storage contents of the fixed magnetic disk device 30. Since the device 30 prestores data signals respectively specifying the image patterns in the same manner as in the first subcodes $A_i$ and address data respectively representing addresses of the optical disk memory 16 for storing the image patterns corresponding to the data signals, the main CPU 20 reads out the proper memory address data of the optical disk with respect to the subcodes $A_i$, thereby reading out from the optical disk device 16 four actual image patterns which respectively correspond to the first subcodes "001", "002", "003" and "004" in FIG. 3. Thus obtained image patterns are transferred to and stored in the first page memory 58 in the station 12. Thereafter, the storage content of the first page memory 58 is transferred through the image bus 64 to the first display memory 68 under the control of the CPU 40. The image data are then displayed on the CRT display device 52 with the touch screen 50 under the control of the display controller 74, in accordance with the display coordinate data stored in the memory presetter 66 as described above. The image displayed in FIG. 2 is thus obtained. As is apparent from FIG. 2, in the menu selection mode, three job selection areas (i.e., labeling job, editing job and filing job) are displayed on the CRT 52 under the heading of "MENU". Therefore, the operator lightly touches a screen portion of a desired job pattern with a touch pen (not shown) or the like. Then, the station 12 is set in the desired job mode.

The job called "labeling" given as a label a title or document name (this is not used for storing data in the optical disk device 16 but is used for the application convenience of the operator) to the registered document information. The job called "editing" processes the registered data in accordance with given editing procedures (e.g., partial deletion and merging of two documents). The job called "filing" corresponds to operations such as registration (entry), retrieval, arrangement and rearrangement.

There are three job menu selections as described. Assume that the operator selects the filing job as the main feature of the present invention.

Figure 4:
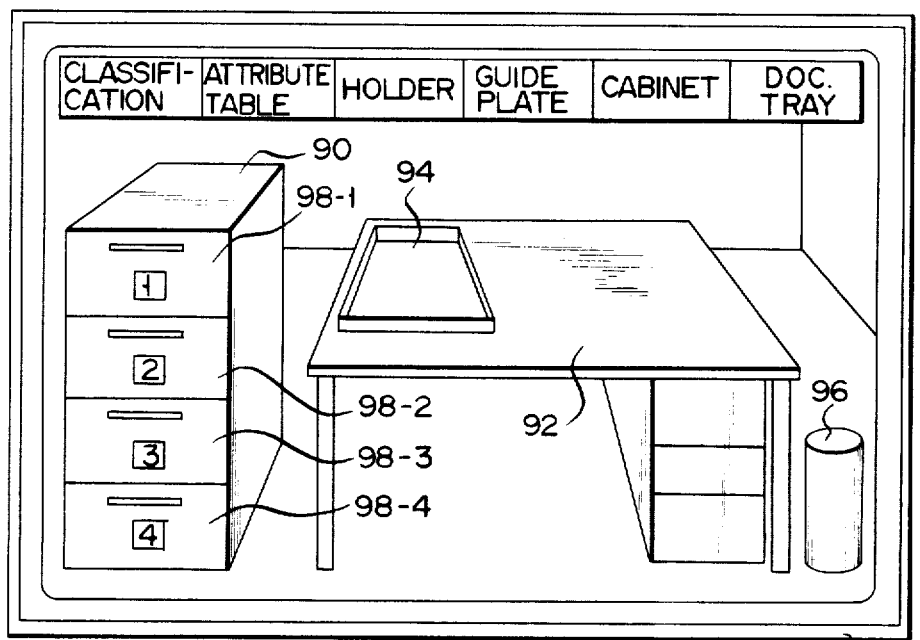

When the station CPU 40 detects that the operator has selected the filing mode, the station CPU 40 supplies to the main CPU 20 an output command for reading out model image patterns representing office filing equipment (e.g., a desk, a filing cabinet, a document tray, a waste paper basket) usually placed around the office worker. In this case, the station CPU 40 supplies the pattern identification code "532" in the table to the control unit 10. The code "532" includes subcode arrays $(A_i,B_i)$ (=$(005,n_5), (006,n_6), \ldots$, and $(008,n_8)$) read out from the floppy disk device 48 in substantially the same manner as in the mode selection menu creation. The fixed magnetic disk device 30 is accessed in accordance with the first subcodes $A_i$ (="005", "006", ..., and "008"). As a result, the memory addresses in the optical disk memory 16 which respectively correspond to the model image patterns stored in the device 30 can be determined, so that the model image patterns can be read out and transferred through the network 14 to the first or second page memory 58 or 60 of the station 12 under the control of the main CPU 20. The second subcodes (or coordinate data) included in the code "532" are stored in the memory presetter 66 in the station 12 in the same manner as in menu creation. As a result, the office illustration associated with the operator is illustrated on the CRT display device 52 with the touch screen 50, as shown in FIG. 4. This illustration is not an actual illustration of the office such as photographic image but is a model image pattern created in accordance with a simple computer graphic technique. The image on the CRT display device 52 in FIG. 4 includes image components 90, 92, 94 and 96 (respectively corresponding to the first subcodes "005", "006", ..., and "008") respectively representing a filing cabinet, a desk, a document tray and a waste paper basket. For example, the image pattern 90 representing the filing cabinet has four drawers 98-1 to 98-4 which are labeled with numbers. At the same time, supplementary characters (i.e., index table, attribute table, holder, guide plate, filing cabinet and document tray) are displayed at the upper portion of the screen of the CRT display device 52.

When the operator performs clerical tasks under these conditions in an actual office, (1) he/she stores each new document in a predetermined location; (2) he/she can search a necessary document among the filed documents; and (3) he/she can arrange or rearrange the documents. The operation of the system will be described with reference to these three cases.

Entry of New Document

Figure 5:
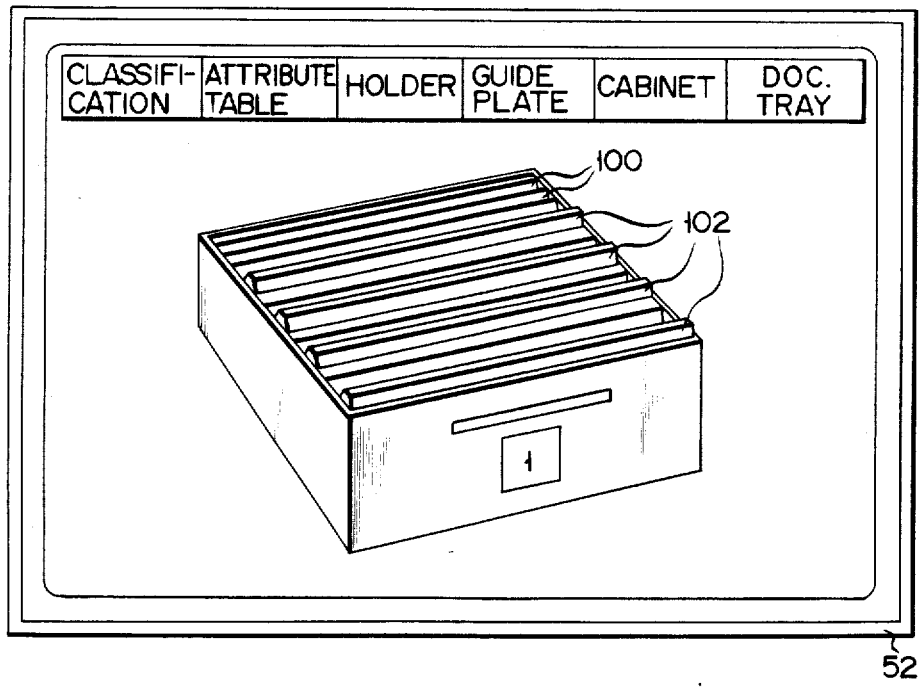
Figure 6:
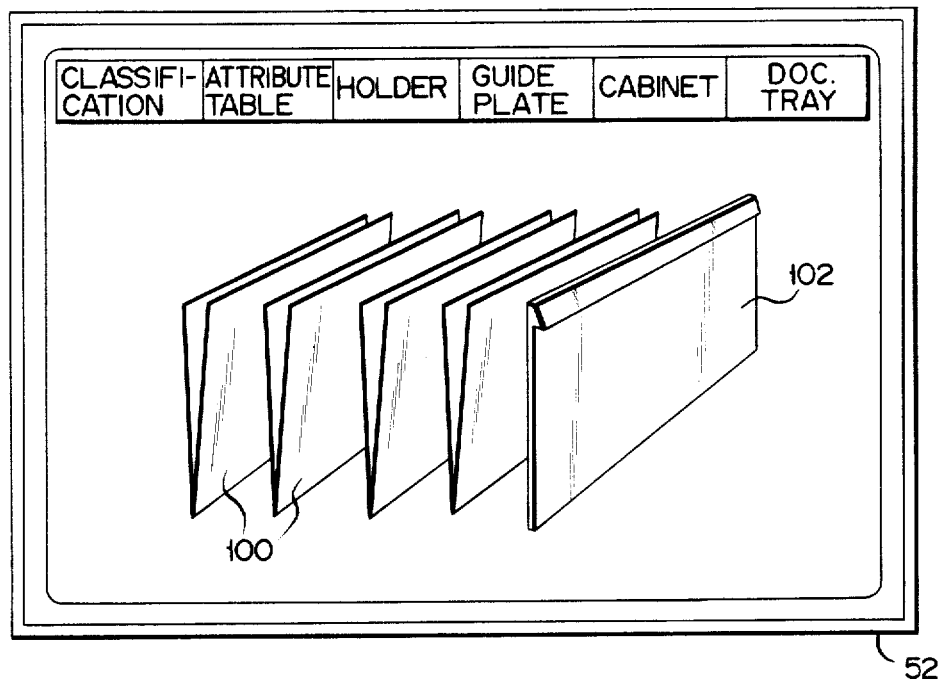

A new document is read by the scanner 78 and is converted to an image signal. The image signal is then transferred to the control unit 10 and is stored in the optical disk device 16 under the control of the main CPU 20. In this case, data, which indicates the correspondence between the address of the document image signal in the optical disk device 16 and a new first subcode added to the input document information, are stored in the fixed magnetic disk device 30 under the control of the main CPU 20. In order to temporarily assign the new document to the document tray 94 in the display on the CRT 52, the coordinate code or second subcode corresponding to the position of the document tray 94 is added to the first subcode. If the operator wishes to store this new document in the first drawer 98-1 of the cabinet 90, the operator brings the touch pen lightly into contact with an area corresponding to the document tray 94 and then with an area of the first drawer 98-1. The contact operation is converted to coordinate data which is then supplied from the station 12 to the control unit 10. The fixed magnetic disk device 30 is accessed by the main CPU 20, and address data (of the optical disk device 16) at which the image pattern data representing the inside of the drawer 98-1 is stored is accessed. The image data representing the inside of the first drawer 98-1 is read out from the optical disk device 16 in accordance with the address data. The image data is supplied to the CRT 52 through the page buffer memory 58 or 60 of the station 12. As a result, the screen of the CRT 52 changes in a manner as shown in FIG. 5, so that the operator can know the image patterns of filing holders 100 with guide plates 102 in the first drawer 98-1. In this case, when the operator brings the touch pen into light contact with an area of a desired guide plate of the holder, substantially the same operation as described above is performed, and the display on the CRT 52 further changes as shown in FIG. 6. Referring to FIG. 6, the operator can see the five filing holders 100 belonging to a selected guide plate 102. When a desired holder is specified in the same manner as described above, the document can be eventually stored (entered) in the desired filing holder on the CRT display. In this case, the second subcode of the document information stored in the optical disk memory is replaced with a subcode for specifying the holder in which the document is electronically "filed".

In this case, other first codes representing an index label name of the specific guide plate 102, a label name of the specific filing holder and the like can be added to the first subcode. In other words, a plurality of first subcodes can be included in the identification code.

An "attribute" table displayed at the upper end of the CRT screen can be used at the time of data entry. When the attribute table is specified, the attribute table is displayed on the screen. The attribute table includes specific features of the input image of a document. For example, items such as a drafter of the document, the date of drafting, a document format, a report, a contract, are displayed. When the operator selects one or more items or attributes of the document, the first identification code corresponding to the image information representing the selected item is added as a keyword to the first identification subcode of the input document. In this manner, it is very convenient to assign a plurality of first identification subcodes to the single image information (or address of this image information) at the time of retrieval.

Document Retrieval

When the operator wishes to search a "filed" document and read it out, he can retrieve the document using the image space illustrated on the CRT display device 52, just as if he/she were opening a desk or cabinet drawer to physically find the document. This mode of operation of the system will be described below.

When the office image shown in FIG. 4 is displayed on the CRT 52, the operator brings the touch pen into light contact with the first drawer 98-1 to retrieve the filed document, and thereafter with the document tray 94. The touch screen 50 attached to the CRT display device 52 supplies an electric signal representing the corresponding coordinates to the station CPU 40. The CPU 40 detects two image patterns (selected by the operator) among the various image patterns stored in the floppy disk device 48. The first identification subcodes of the selected image pattern are supplied to the main CPU 20 in the control unit 10 under the control of the station CPU 40. In this case, the first subcode "005" (FIG. 3) of the filing cabinet 90 and the first subcode "007" of the document tray 94 are supplied to the main CPU 20. The main CPU 20 accesses the floppy disk memory 28 in the control unit 10 in response to these subcode data. As a result, the subcode array indicating movement of the document from the first drawer 98-1 to the document tray 94 detects that the retrieval operation is performed. The retrieval mode selection signal stored in the floppy disk memory 28 so as to correspond to these first subcodes is supplied to the station CPU 40. In response to this, the CPU 40 generates the identification code to cause the CRT display device 52 to display the image pattern representing the detailed contents of the selected drawer 98-1, as shown in FIG. 5. The floppy disk device 48 is accessed in accordance with this identification code data, thereby displaying the image pattern (FIG. 5) on the CRT display device 52. The operator can see the guide plates 102 contained in the first drawer 98-1.

When the operator specifies the desired guide plate 102 on the screen, the enlarged filing holders 100 partitioned by the guide plate are displayed on the CRT 52 in substantially the same manner as described above. Characters corresponding to the index label names are displayed together with the holder image patterns. When the operator selects a desired one of the holders, the station CPU 40 detects the selected holder image in the same manner as described above. Subsequently, the first subcode (or first subcodes) of the documents "filed" in the holder is detected. Therefore, the fixed magnetic disk device 30 is accessed so as to extract the second subcode(s) (i.e., address data) of the image pattern(s) of the corresponding first subcode(s). The optical disk device 16 is accessed in accordance with the address data. As a result, the image information corresponding to the documents "filed" in the holder is read out. These pieces of image information are sequentially transferred to the station 12 through the network 14 and are stored in the first and second page memories 58 and 60. When storage of the document image information for one field of the screen is completed, the image information is displayed by the display controller 74 on the document CRT display device 76. The operator can observe a desired document on the CRT display device 76.

Document Rearrangement

The "arrangement" or "rearrangement" means that one or more documents among the filed documents are arranged under a new index (having new hierarchical free structure) in accordance with the first predetermined indexing method. Document filing locations are often changed in the course of daily office work. Such operations can be effectively performed by the system of the present invention.

Assume that any desired document among the documents "filed" in the drawers 98 of the filing cabinet is moved from one drawer to another drawer. The operator brings the touch pen into light contact with the patterns of the cabinet 90, the document tray 94 and then the cabinet 90 again on the screen display of the CRT display device 52 in FIG. 4. Thus, three position data signals are supplied from the touch screen 50 to the main CPU 20. The CPU 20 detects that the combination of three signals represents the rearrangement operation by accessing the floppy disk device 28, since the floppy disk device 28 prestores data indicating that a combination of three data represents the rearrangement mode.

In the document rearrangement step, the pictures in FIGS. 5 and 6 are displayed following the image of FIG. 4. An empty holder (not shown) having no documents is added to the image shown in FIG. 6. When the operator selects the desired labeled holder 100 with the touch pen on the CRT 52 of FIG. 6 and at the same time selects an area indicating the "attribute" table at the end portion of the screen, character patterns indicating the various attribute items are displayed on the CRT screen. When the operator selects one of the character patterns, the contents of the first identification subcodes which correspond to the holder image patterns and which are included in the identification codes change. Therefore, an image pattern of an empty holder with the above-described attribute item is added. In this operation, among the identification codes corresponding to the image pattern components constituting the image pattern in FIG. 6, the first identification subcodes corresponding to the holders 100 are detected. The holder located at the rightmost end adjacent to the guide plate 102 is searched on the CRT screen in accordance with the second subcodes or coordinate data which is paired with the detected first subcodes. In order to display all the holders including an unlabeled holder at equal intervals, a given value is subtracted from respective coordinates of each of the holders including the rightmost holder, thereby obtaining new coordinates.

Figure 7:
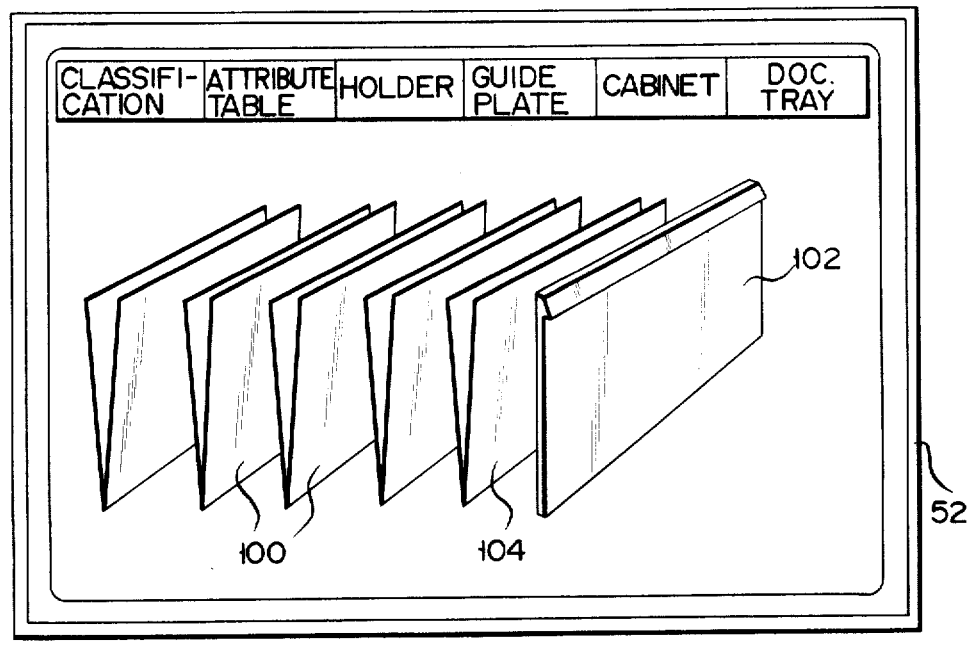

In order to move the index character on the CRT screen, correcting coordinates ($\Delta x$, $\Delta y$) for correcting the label display position with respect to the new coordinates are added. In this manner, the image patterns representing all the holders including an added holder 104 are displayed on the CRT 52 at equal intervals with respect to a given guide plate 102, as shown in FIG. 7. Thereafter, the corresponding identification codes are properly modified such that the character image pattern representing the predetermined attribute item is added to the new holder 104. The index system determined at the beginning can be easily updated on the office space representation displayed on the CRT screen as if the operator had actually performed the desk work associated with the information rearrangement system of the present invention. In order to store a desired document in the new holder 104, the current filing location and then the new holder 104 are specified with the touch pen. As a result, the identification code of the document stored in the optical disk memory 16 can be edited with the holder 104.

In order to delete a document stored in the optical disk memory 16 as part of a rearrangement, an unnecessary document is specified in a manner described in association with the retrieval mode, and the image pattern 96 representing the waste paper basket in the CRT picture is specified with the touch pen. As a result, the delete signal is fetched into the main CPU 20. The information corresponding to the document is deleted from the storage contents in the optical disk memory 16 under the control of the CPU 20.

Assume that the operator selects the labeling mode when the menu selections shown in FIG. 2 are displayed on the CRT display device 52. When the operator brings the touch pen lightly into contact with the area representing "labeling" on the CRT display, the electrical position data corresponding to this screen area is supplied from the touch screen 50 to the station CPU 40. The CPU 40 causes the CRT 52 to set the image pattern identification codes required to display the picture shown in FIG. 8. The image pattern data corresponding to these identification codes are read out from the floppy-disk device 48 and then required image patterns are read out from the optical disk device 16 to be displayed on the CRT 52.

Figure 8:
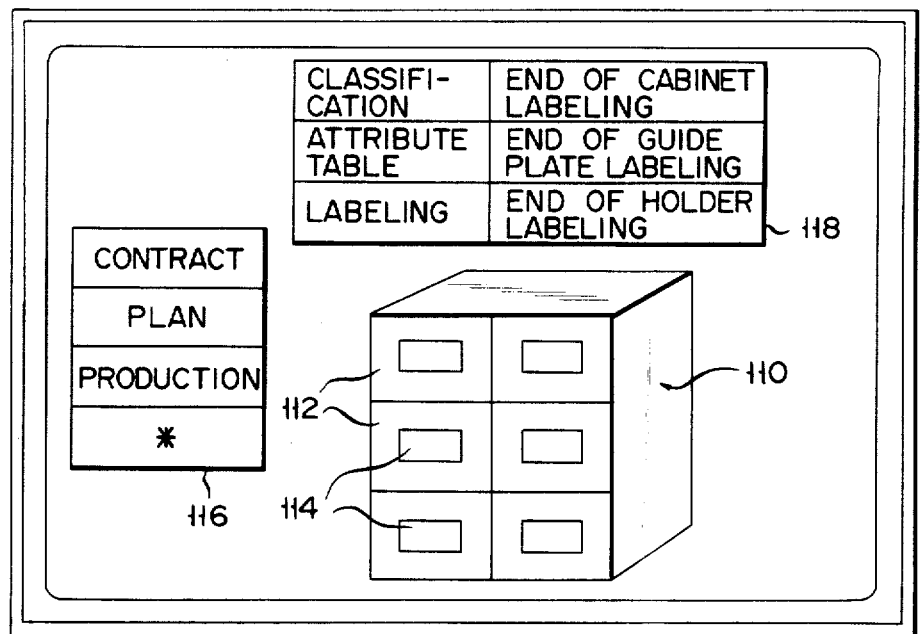

The image pattern representing a filing cabinet 110 having a plurality of drawers 112 is displayed on the CRT display shown in FIG. 8. The drawers 112 are displayed with tags 114, respectively. Referring to FIG. 8, a first character display area 116 indicates higher-order index items or higher hierarchical sequential items (e.g., contract, plan, production) concerning office document filing. A second character display area 118 indicates selection columns. When the operator wishes to display one of the drawers 112 with index names on the CRT display, he/she selects a desired one of the item names with the touch pen, and subsequently specifies the tag portion with the touch pen. As a result, the identification subcodes corresponding to the specified cabinet drawer are updated by the floppy disk device 48. This operation is repeated so that the operator can name or label the drawers 112 of the filing cabinet 110 on the CRT screen. When the area "labeling" in the second character display area 118 on the CRT display is specified by the operator, the pieces of information which are obtained as described above constitute identification codes corresponding to the single cabinet 110. A signal which represents the end of labeling is supplied to the station CPU 40.

Figure 9:
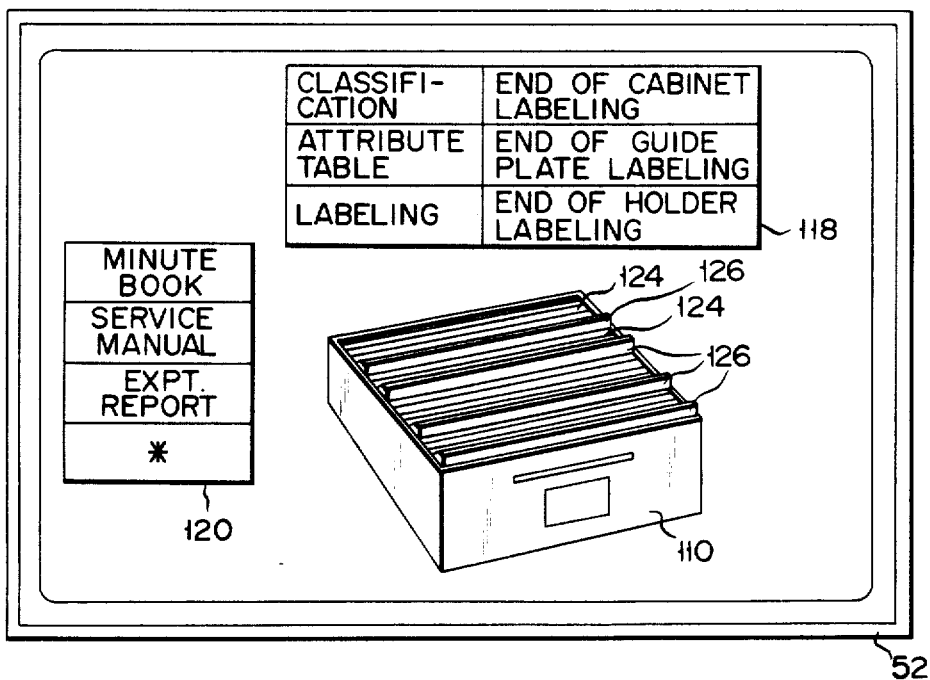

When one of the higher-order indices attached to the cabinet drawers is selected, the CRT screen changes to display a picture shown in FIG. 9. This screen includes an image pattern representing the selected drawer 112 and another character display area 120 indicating middle-order filing index items e.g., minute block, service manual, experiment report. The drawer 112 is pictorially illustrated on the CRT screen as containing filing holders 124 and guide plates 126. The labeling of each guide plate 126 on the CRT screen is performed by the operator with the touch pen in substantially the same manner as described above; a desired portion is touched with the touch pen. When the operator specifies "labeling" on the CRT display in FIG. 9, the CRT display device 52 changes its screen (FIG. 9) to a screen (FIG. 10). The screen in FIG. 10 includes a character display area 122 representing lower-order filing index items and enlarged image patterns each representing a corresponding one of a plurality of filing holders filed in association with the selected guide plate 126. Labeling with an item selected from the area 122 with respect to the individual holders can be performed in substantially the same manner as described above. As is apparent from the above description, labeling is equivalent to the operation wherein the station CPU 40 adds necessary first and second subcodes to the image pattern identification subcodes stored in the floppy disk device 48.

According to the above embodiment, the operator can perform clerical tasks including document entry and rearrangement while observing the office illustration which is displayed on the CRT display device 52 and which is associated with the office worker as the operator at the station 12, as if he or she were actually present in the depicted office space. For example, a document to be newly registered or entered is displayed on the CRT display device 76, while the office space (including a desk with drawers, a filing cabinet, a waste paper basket, etc.) is displayed on the CRT 52. In this state, the office worker as the operator feels as if he is looking at paper documents at his desk in an actual office. In an actual office, when he or she stores a paper document in a predetermined filing holder in a predetermined desk drawer, he/she must remove the predetermined file holder and insert the actual document therein. The system of the present invention can be operated exactly as if the worker is performing actual filing. In the above display state, the operator specifies a desk drawer with the touch pen or the like and further specifies a desired holder. As a result, the electrical image information of the document to be stored in the optical disk memory 16 is assigned the identification code corresponding to the specified holder. Therefore, the operator feels as if the document has been filed in the image picture pattern representing the filing holder in the drawer. According to the present invention, when the operator directly specifies the document filing location on the CRT screen in accordance with the pictorial illustration representing the office space, without depending on the character display, he/she can easily perform clerical tasks such as entry and rearrangement of documents. In this case, the operator need not actually open the drawer of an actual desk or move the paper document. The actual clerical work (particularly filing tasks) performed in the actual office can be simply, equivalently performed at high speed by direct access of pictorial representations on the CRT display under the control of the computer at a high speed, just as if the worker is present in the office space depicted on the CRT.

Furthermore, according to the present invention, the filing locations of the documents or file rearranging/indexing system itself can be changed by operation of the touch pen on the display screen. Therefore, a large number of documents common to several workers can be freely generated/edited in accordance with individual workers' needs. Furthermore, the system of the present invention does not require a large space as compared with the conventional filing system. The operator will not feel indifference caused by the fact that he is operating a highly developed computerized machine, since he/she only specifies equipment on the CRT screen which are necessary for the progress of actual clerical tasks.

Furthermore, according to the present invention, the single control unit 10 including the main CPU 20 and the large-capacity memory such as the optical disk memory 16 is connected to the plurality of stations 12 and can provide parallel processing with respect to the stations 12. A large amount of company document information can be accessed by an individual operator or a group of operators at the station and can be rearranged therefor. When the document indexing/rearranging method (system) is partially or entirely modified for the operator or group of operators to which a single station is assigned, the operation at this station will not influence those at other stations, thereby freely achieving the rearranging system.

Although the present invention has been shown and described with respect to a particular embodiment, various changes and modifications which are obvious to a person skilled in the art to which the invention pertains are deemed to lie within the spirit and scope of the invention.

In the above embodiment, all the image information entered at the image input device comprises bit map information. However, the bit map information can be replaced with a command supplied to a graphic generator and a character generator. In addition to this modification, a still image as part of the entire image can be written in a ROM without departing from the scope of the present invention.

Furthermore, in the above embodiment, the index items and attribute items are included in the identification subcodes. However, these may be stored in the data base and may be defined in association with the corresponding identification subcodes so as to effectively retrieve the desired data. In the above embodiment, for the sake of simplicity, only the case has been described wherein the index items and the attribute items are included.

What is claimed is:

1. A computer-processed apparatus for storing electrical document image information representing paper documents in accordance with a changeable rearranging/indexing system and for performing the filing of the document information, said apparatus comprising:
   (a) a memory device for storing a totality of document information;
   (b) first display means for displaying the content of document image information;
   (c) second display means for visually displaying a hierarchical structure of document filing system, which represents hierarchical relationship among filing positions of document information, by using picture image patterns including pictorial illustrations of office supplied and furniture for filing paper documents, said picture image patterns representing pictorial filing items arranged in a hierarchical sequence and providing an operator a model image of an actual work plate; and
   (d) control means, connected to said memory device and said first and second display means, for controlling said first display means to display the content of input document information to be newly filed and for controlling said second display means to sequentially display picture image patterns in such a manner that said second display means displays a first picture image pattern representing parent pictorial items in the hierarchical filing structure to thereby allow the operator to select a desired filing place in which the input document information is stored and changes its display screen to display a second picture image pattern, which enlarges and illustrates child/sibling pictorial items included in one of the parent items which is selected by the operator, and repeating its display operation until one of the most-specific descendant pictorial items is designated by the operator, whereby the operator is free from manually creating data for identifying the input document information from the other document information which have been filled in said apparatus so that the operator can be allowed to file the input document information in the same manner as he files actual paper documents using actual office supplies.

2. The apparatus according to claim 1, wherein, when a filing place of the input document information is finally determined by the operator upon referring to a conceptual work place image pattern displayed on said second display means, said control means produces electrical code data specifying the final filing position represented by the finally selected most specific descendant pictorial item, automatically correlates the input document information with the electrical code data, and stores the input document information at a corresponding memory address in said memory device.

3. The apparatus according to claim 2, wherein, when subsequent selection of image components representing first and second filing items included in the most-specific descendant pictorial items is detected while the operator observes a picture image pattern displayed on said second display means, said control means decides that a filing position of document information is desired by the operator to be changed from the first item to the second item, causes said first display means to display desired document image information considered for the operator to be originally stored in the first item, and automatically changes code data associated with the document information to another code data specifying the second item, thereby making the operator feel as if he is actually changing a filing position of desired document for document rearrangement in a local work place displayed on said second display means.

4. The apparatus according to claim 3, which further comprises:
sensitive screen means, mounted to said second display means so as to cover a display screen of said second display means, for detecting that the operator directly touches an area of a desired image pattern component representing one of the pictorial filing items included in the picture image patterns and for generating an electrical coordinate signal corresponding to a selected image pattern component.

5. The apparatus according to claim 4, wherein said control means produces the code data associated with document information in accordance with the electrical coordinate signal.

6. The apparatus according to claim 3, which further comprises:
magnetic memory means, connected to said control means and said second display means, for storing coordinate data to be updated so as to specify display positions of image pattern components representing pictorial filing items on said second display means, the image pattern components being adapted to represent the various types of office equipments, including a desk with drawers and a filing cabinet which are represented by the first picture image pattern, and filing holders contained in each office equipment.

7. The apparatus according to claim 4, wherein said control means controls said second display means such that the holder image pattern components are aligned in accordance with the coordinate data assigned thereto when the filing holders contained in one office equipment is displayed on said second display means, whereby display positions of the holder image pattern components are freely changed, just as if the operator was actually changing filing positions in actual filing holders in the actual work place.

8. The apparatus according to claim 2, wherein, when a desired piece of document information is detected to be retrieved from among document information stored in said apparatus, said control means controls said second display means to sequentially display picture image patterns, which represents pictorial filing items arranged in a hierarchical sequence, in such a manner that said second display means displays the first picture image pattern representing parent pictorial items in the hierarchical structure of the document filing system to thereby allow the operator to designate a filing place for a desired piece of document image information and changes its display screen to display the second picture image pattern, which enlarges and illustrates child/sibling pictorial items included in the parent item designated by the operator, whereby, when the operator designates one of the most specific descendant pictorial items, said control means accesses said memory device to read out document information stored at memory address corresponding to the designated most specific descendant pictorial item.

9. The apparatus according to claim 8, further comprising:
page buffer memory means connected to said memory device and said first display means, for sequentially receiving the readout document information from said memory device under the control of said control means and for temporarily storing said readout document information, said page buffer memory means supplying one readout document information finally selected by the operator to said first display means, which visually displays the content of said one readout document information.

10. The apparatus according to claim 9, said page buffer memory means comprises two page buffer memories.

11. A document rearranging system comprising:
(a) a plurality of work station units each assigned to an operator, each work station comprising
scanner means for optically scanning a paper document to produce corresponding electrical document image information,
first display means for displaying the document image information,
second display means for visually displaying a hierarchic structure of document filing system, which represents hierarchical relationship among filing positions of document information, by using picture image patterns including pictorial illustrations of various types of office supplies and furniture for filing paper documents, said picture image patterns representing pictorial filing items arranged in hierarchical sequence and providing an operator a model image of a local work location of an actual work place, and first control means connected to said first and second display means, for controlling said second display means to sequentially display picture image patterns in such a manner that said second display means displays first picture image pattern, which represents a perspective pictorial illustration of an actual work place in which office supplies including at least one filing cabinet are arranged and presents parent pictorial items in the hierarchic filing structure, and changes its display screen to display a second picture image pattern representing and illustrating filing holders which are contained in one of the office supplies into which the paper document is to be filed and correspond to child/sibling pictorial items included in one of the parent items selected by the operator, and for producing electrical code data specifying a holder image pattern component which is finally selected by the operator as a filing place of the paper document upon referring to a conceptual work place image pattern displayed on said second display means; and (b) a host control unit, connected to said work station units, for controlling said work station units, said host control unit comprising optical disk memory means for storing a totality of document information entered at said plurality of work station units, and second control means for correlating the document information with the code data and for supplying the document information to said optical disk memory means, said second control means being arranged to read out the document information from said optical disk memory means in accordance with the code data and to allow said first display means to display the document information when the operator selects the filing holder displayed on said second display means included in any one of said plurality of work station units.

12. The system according to claim 11, which further comprises:

data transferring means for performing data transfer between said plurality of station units and said host control unit.

13. The system according to claim 12, wherein said second control means supplies to any one of said plurality of work station units desired document information which is read out from said optical disk memory means in accordance with a need of the operator at said any one of said plurality of work station units, and allows the operator to freely determine a filing location of the desired document information at said one work station unit, independently of other work station units of said plurality of work station units, by properly selecting one of the office equipments contained is a conceptual work space displayed at said second display means thereby performing document rearrangement.

14. The system according to claim 13, wherein said second control means supplies identical document information to at least two work station units of said plurality of work station units when said second control means detects that said at least two work station units require the identical document information, whereby the identical document information stored in said optical disk memory means is assigned with different filing location code data in accordance with different index systems given to operators at said at least two station units.

15. The system according to claim 14, wherein each of said plurality of work station units further comprises:

a plurality of page memory means connected to said first display means, for temporarily storing document information to be displayed on said first display means, thereby increasing a screen switching speed of document image information corresponding to one paper document displayed on said first display means.

16. A method for storing electrical document image information representing paper documents in accordance with a changeable rearranging/indexing system and for filing the document information, said method comprising the steps of:

(a) optically scanning a paper document to be newly filed to produce corresponding electrical document image information;

(b) displaying the document information on a first display device in response to the electrical document image signal;

(c) visually displaying a hierarchical structure of document filing system, which represents hierarchical relationship among filing positions of document information, on a second display device using picture image patterns, which include pictorial illustrations of office supplies for filing paper documents and which represent pictorial filing items arranged in a hierarchical sequence to provide an operator a model image of an actual work place, in such a manner that said second display device displays a first picture image pattern representing parent pictorial items in the hierarchic filing structure to thereby allow the operator to select a desired filing place in which the input document information is to be stored and changes its display screen to display a second picture image pattern, which enlarges and illustrates child/sibling pictorial items included in one of the parent items which is selected by the operator, and repeating its display operation until one of the most specific descendant pictorial items is desginated by the operator;

(d) producing, when a filing place of the input document information is finally determined by the operator upon referring to a conceptual work place image pattern displayed on said second display device, electrical code data specifying the final filing position represented by the finally selected, most specific descendant pictorial item; and (e) automatically correlating the input document information with the electrical code data to supply the input document information to a memory device so as to store the input document information at a corresponding memory address in said memory device, whereby the operator is free from manually creating data for identifying the input document information from the other document information which have been filed in said apparatus so that the operator can be allowed to file the input document information in the same manner as he files actual paper documents using actual office supplies.

17. The method according to claim 16, wherein further comprising the steps of:

accessing said memory device when the code data is regenerated by causing the operator to select the final filing position on said second display device to read out the input document information which is then displayed on the first display device, whereby the operator feels as if he is manually rearranging the input document information in the actual location and hence performing actual document filing.

18. The method according to claim 16, further comprising the steps of:

detecting that the operator sequentially specifies first and second document filing positions on a display screen while referring to the first picture image pattern displayed on said second display device;

displaying on said first display device document information desired for the operator, which is conceptually stored in said first document filing position; and changing code data correlated with the desired document information to another code data specifying the second filing position, whereby the operator feels as if he has performed a filing job for changing the filing position of the document in accordance with an updated indexing system.

* * * * *